(12) United States Patent
He

(10) Patent No.: US 10,726,207 B2
(45) Date of Patent: Jul. 28, 2020

(54) EXPLOITING DOCUMENT KNOWLEDGE FOR ASPECT-LEVEL SENTIMENT CLASSIFICATION

(71) Applicant: SAP SE, Walldorf (DE)

(72) Inventor: Ruidan He, Singapore (SG)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 16/200,829

(22) Filed: Nov. 27, 2018

(65) Prior Publication Data

US 2020/0167419 A1 May 28, 2020

(51) Int. Cl.
*G06F 40/30* (2020.01)
*G06N 3/08* (2006.01)
*G06N 3/04* (2006.01)

(52) U.S. Cl.
CPC .......... *G06F 40/30* (2020.01); *G06N 3/0445* (2013.01); *G06N 3/08* (2013.01)

(58) Field of Classification Search
USPC ...................................................... 704/1–504
See application file for complete search history.

(56) References Cited

U.S. PATENT DOCUMENTS

| | | | |
|---|---|---|---|
| 9,336,776 B2 | 5/2016 | Dahlmeier et al. | |
| 10,380,259 B2 * | 8/2019 | Lee | G06N 5/04 |
| 2012/0209751 A1 * | 8/2012 | Chen | G06Q 30/06 705/27.2 |
| 2017/0024455 A1 | 1/2017 | Powell et al. | |
| 2017/0103324 A1 | 4/2017 | Weston et al. | |
| 2017/0193098 A1 | 7/2017 | Randhawa et al. | |
| 2018/0165554 A1 * | 6/2018 | Zhang | G06K 9/6256 |
| 2018/0268287 A1 * | 9/2018 | Johansen | G06N 3/0445 |
| 2018/0268298 A1 * | 9/2018 | Johansen | G06F 15/76 |
| 2018/0285344 A1 * | 10/2018 | He | G06F 40/30 |
| 2018/0293499 A1 * | 10/2018 | He | G06F 40/216 |
| 2018/0336183 A1 * | 11/2018 | Lee | G06F 40/30 |
| 2019/0122101 A1 * | 4/2019 | Lei | G06F 17/16 |

* cited by examiner

*Primary Examiner* — Marcus T Riley
(74) *Attorney, Agent, or Firm* — Fish & Richardson P.C.

(57) ABSTRACT

Methods, systems, and computer-readable storage media for receiving a set of document-level training data including a plurality of documents, each document having a sentiment label associated therewith, receiving a set of aspect-level training data including a plurality of aspects, each aspect having a sentiment label associated therewith, training the aspect-level sentiment classifier including a long short-term memory (LSTM) network, and an output layer using one or more of pretraining, and multi-task learning based on the document-level training data and the aspect-level training data, pretraining including initializing parameters based on pretrained weights that are fine-tuned during training, and multi-task learning including simultaneous training of document-level classification and aspect-level classification, and providing the aspect-level sentiment classifier for classifying one or more aspects in one or more sentences of one or more input documents based on sentiment classes.

20 Claims, 4 Drawing Sheets

EXPLOITING DOCUMENT KNOWLEDGE FOR ASPECT-LEVEL SENTIMENT CLASSIFICATION

BACKGROUND

Aspect-based sentiment analysis includes the machine processing of text to determine aspects (e.g., topics) that the text refers to, as well as a sentiment conveyed for aspects. Aspect extraction is an important and challenging task in aspect-based sentiment analysis. Attention-based long short-term memory (LSTM) networks have proven to be useful in aspect-level sentiment classification. However, due to the difficulties in annotating aspect-level data, existing public datasets for this task are all relatively small, which largely limits the effectiveness of those neural models.

SUMMARY

Implementations of the present disclosure are directed to aspect-based sentiment analysis. More particularly, implementations of the present disclosure are directed to exploiting document knowledge for aspect-based sentiment classification.

In some implementations, actions include receiving a set of document-level training data including a plurality of documents, each document having a sentiment label associated therewith, receiving a set of aspect-level training data including a plurality of aspects, each aspect having a sentiment label associated therewith, training the aspect-level sentiment classifier including a long short-term memory (LSTM) network, and an output layer using one or more of pretraining, and multi-task learning based on the document-level training data and the aspect-level training data, pretraining including initializing parameters based on pre-trained weights that are fine-tuned during training, and multi-task learning including simultaneous training of document-level classification and aspect-level classification, and providing the aspect-level sentiment classifier for classifying one or more aspects in one or more sentences of one or more input documents based on sentiment classes. Other implementations of this aspect include corresponding systems, apparatus, and computer programs, configured to perform the actions of the methods, encoded on computer storage devices.

These and other implementations can each optionally include one or more of the following features: training the aspect-level sentiment classifier using pretraining further includes, for each document, using a last hidden vector provided from the LSTM network as a document representation that is processed by the output layer; training the aspect-level sentiment classifier using pretraining further includes, for each document, using a mean hidden vector of a set of hidden vectors provided from the LSTM network as a document representation that is processed by the output layer; training the aspect-level sentiment classifier includes using pretraining and multi-task learning in combination, where, for each document, a mean hidden vector of a set of hidden vectors provided from the LSTM network being used as a document representation that is processed by the output layer; a training objective for training the aspect-level sentiment classifier includes cross-entropy minimization; the sentiment classes include positive, and negative; and training of the aspect-level classifier includes initializing parameters using parameters of a trained document-level classifier.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
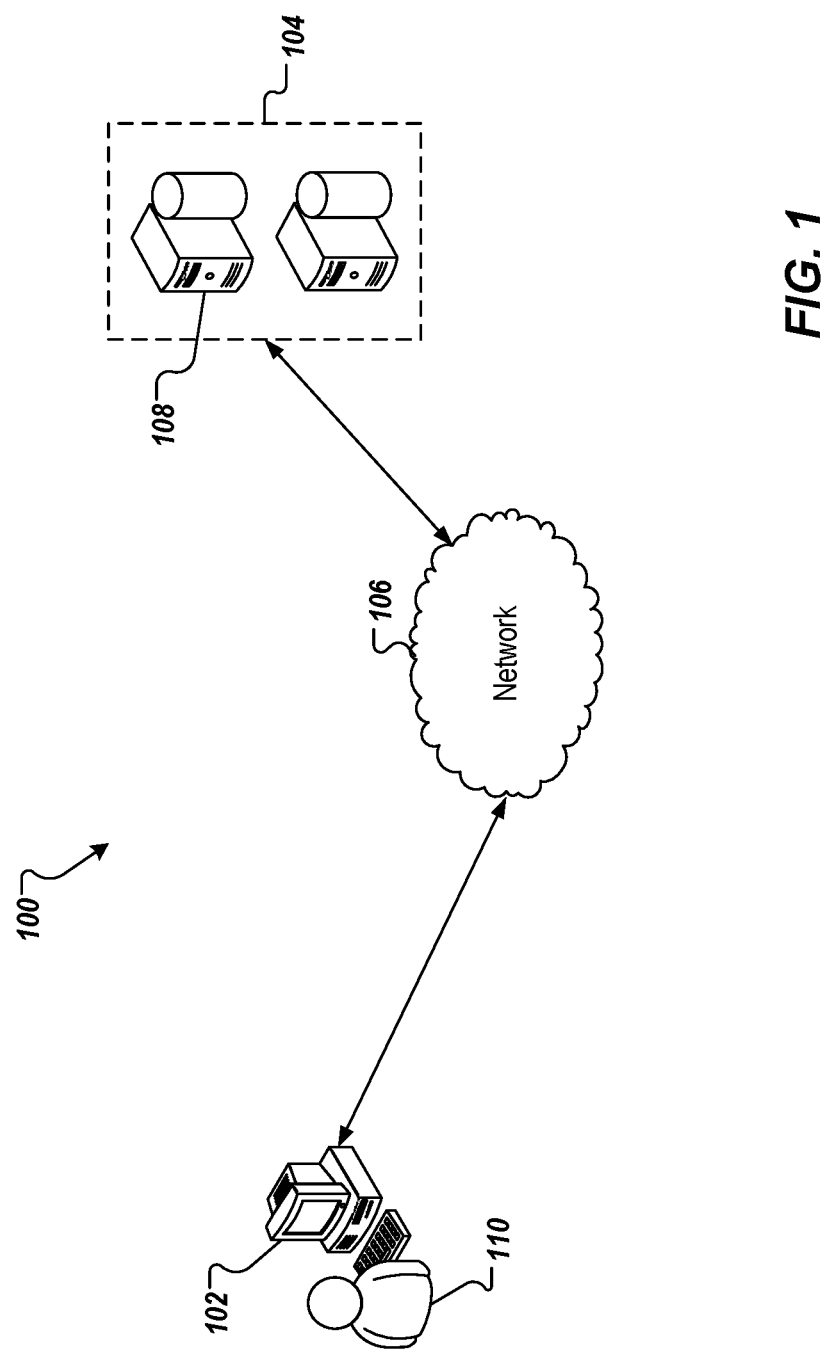
FIG. 1 depicts an example architecture that can be used to execute implementations of the present disclosure.

Implementations of the present disclosure are directed to aspect-based sentiment analysis. More particularly, implementations of the present disclosure are directed to exploiting document knowledge for aspect-based sentiment classification. Implementations can include actions of receiving a set of document-level training data including a plurality of documents, each document having a sentiment label associated therewith, receiving a set of aspect-level training data including a plurality of aspects, each aspect having a sentiment label associated therewith, training the aspect-level sentiment classifier including a long short-term memory (LSTM) network, and an output layer using one or more of pretraining, and multi-task learning based on the document-level training data and the aspect-level training data, pretraining including initializing parameters based on pre-trained weights that are fine-tuned during training, and multi-task learning including simultaneous training of document-level classification and aspect-level classification, and providing the aspect-level sentiment classifier for classifying one or more aspects in one or more sentences of one or more input documents based on sentiment classes.

To provide further context for implementations of the present disclosure, and as introduced above, given a sentence and an opinion target (also called an aspect term) occurring in the sentence, aspect-level sentiment classification aims to determine the sentiment polarity in the sentence
} towards the opinion target. An opinion target (or target for short) refers to a word (or a phrase) describing an aspect of an entity. For example, in the sentence "This little place has a cute interior décor, but the prices are quite expensive," the targets are "interior décor" and "prices," and they are associated with positive (cute) and negative (quite expensive) sentiments, respectively.

A sentence may contain multiple sentiment-target pairs. One challenge is to separate different opinion contexts for different targets. For this purpose, traditional approaches have adopted attention-based long short-term memory (LSTM) networks, and an attention mechanism. In such approaches, the LSTM networks aim to capture sequential patterns, and the attention mechanism aims to emphasize target-specific contexts for encoding sentence representations. Typically, LSTM networks only show their potential when trained on large datasets. However, aspect-level training data requires the annotation of all opinion targets in a sentence, which is time, and resource-intensive to obtain in practice. As such, existing public aspect-level datasets are all relatively small. Insufficient training data limits the effectiveness of neural models that are trained using the limited training data.

Despite the lack of aspect-level labeled data, enormous document-level labeled data are easily accessible online. An example includes Amazon reviews. These reviews contain substantial linguistic patterns, and come with sentiment labels.

Implementations of the present disclosure improve aspect-level sentiment classification by employing knowledge gained from document-level sentiment classification. Specifically, implementations of the present disclosure provide multiple transfer methods to incorporate this sort of knowledge—pretraining and multi-task learning. Using the multiple transfer methods, significant improvements can be achieved over attention-based LSTM models that are trained only on aspect-level data. In some implementations, the transfer methods can be used individually, or in combination.

As described in further detail herein, implementations of the present disclosure leverage document-level, labeled training data to gain knowledge (linguistic information) that is transferred to aspect-level data to provide labeled, aspect-level training data for training the aspect-level sentiment classifier. In some implementations, a domain of the document-level data is the same as, or similar to a domain of the aspect-level data, such that the linguistic information learned from document-level data can be transferred to the aspect-level task. For example, in training an aspect-level classifier on a restaurant domain, the document-level data is also from the restaurant domain. In some examples, the document-level data includes a set of documents, each document having one or more sentences, and being labeled (e.g., as either positive, or negative in a binary class scenario).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 104 can host an aspect-based sentiment classifier that processes documents, identifies a set of aspects, and for each aspect, provides a sentiment classification. Using the example above, the aspect-based sentiment classifier can process an online review website (e.g., an electronic document including reviews submitted by users) that includes the sentence "This little place has a cute interior décor, but the prices are quite expensive," among many others, identify aspects of "interior décor" and "prices," and associate the aspects with positive (cute) and negative (quite expensive) sentiment classifications, respectively.

As described in further detail herein, implementations of the present disclosure use a conventional implementation of an attention-based LSTM model as a baseline. In accordance with implementations of the present disclosure, the attention-based LSTM is extended with pretraining, and multi-task learning to incorporate document-level knowledge.

In some implementations, inputs include a sentence $s=(w_1, w_2, \ldots, w_n)$ consisting of n words, and an opinion target $x=(x_1, x_2, \ldots, x_m)$ occurring in the sentence consisting of a subsequence of m words from s. Each word is associated with a continuous word embedding $e_w$ from an embedding matrix $E \in \mathbb{R}^{V \times d}$ where V is the vocabulary size and d is the embedding dimension. A LSTM network is used to capture sequential information, and outputs a sequence of hidden vectors as:

$$[h_1, \ldots, h_n] = \text{LSTM}([e_{w_1}, \ldots, e_{w_n}], \theta_{lstm}) \qquad (1)$$

An attention layer assigns a weight $\alpha_i$ to each word in the sentence. The final target-specific representation of the sentence s is then given by:

$$z = \Sigma_{i=1}^n \alpha_i h_i \qquad (2)$$

And $\alpha_i$ is computed as follows:

$$\alpha_i = \frac{\exp(\beta_i)}{\sum_{j=1}^n \exp(\beta_j)} \qquad (3)$$

$$\beta_i = f_{score}(h_i, t) = \tanh(h_i^T W_a t) \qquad (4)$$

$$t = \frac{1}{m}\sum_{i=1}^{m} e_{x_i} \quad (5)$$

where t is the target representation computed as the averaged word embedding of the target, and $f_{score}$ is a content-based function that captures the semantic association between a word and the target. In some examples, a formulation is adopted for $f_{score}$ that includes a parameter matrix $W_a \in \mathbb{R}^{d \times d}$. The sentence representation z is fed into an output layer to predict the probability distribution p over sentiment labels on the target:

$$p = \text{softmax}(W_o z + b_o) \quad (6)$$

The above-described model is referred to as the baseline model (LSTM+ATT). This baseline model is trained using cross-entropy minimization:

$$J = -\Sigma_{i \in D} \log p_i(c_i) \quad (7)$$

where D denotes the overall training corpus, $c_i$ denotes the true label for sample i, and $p_i(c_i)$ denotes the probability of the true label.

As introduced above, implementations of the present disclosure extend the baseline model (LSTM+ATT) using transfer approaches of pretraining, and multi-task learning to incorporate document-level knowledge. In accordance with implementations of the present disclosure, LSTM+ATT is used as an aspect-level model with parameter set $\theta_{aspect} = \{E, \theta_{lstm}, W_a, W_o, b_o\}$. In some implementations, a LSTM-based classifier is provided based on document-level training examples. The LSTM-based classifier is identical to the LSTM+ATT except absent the attention layer. The training objective is also cross-entropy minimization as shown in equation (7), and the parameter set is $\theta_{doc} = \{E', \theta_{lstm}', W_o', b_o'\}$.

As described in further detail herein, implementations of the present disclosure use document-level data, and aspect-level data in training an aspect-level sentiment classifier. In some examples, the aspect-level data denotes sentences with aspect terms/targets with respective sentiments annotated. For example, "I like the food here, but the service is horrible," aspect-level data requires to annotate "food" with positive sentiment, and "service" with negative sentiment. As introduced above, aspect-level data is hard to obtain in practice, and the amount of aspect-level data is relatively small across many domains. Accordingly, and as described in further detail herein, document-level data, which is much easier to obtain as another training source, is leveraged to boost the performance of aspect-level sentiment classification.

As described in further detail herein, information extracted from document-level data is transferred using pretraining, and/or multi-task learning. In pretraining, a document-level model (also referred to as document-level classifier) is trained using document-level data, and each document is represented as the last hidden vector returned by a LSTM network. An aspect-level model (also referred to as aspect-level classifier) is trained with aspect-level data, and parameters of the pre-trained document model are used to initialize the relevant parameters of the aspect-level model. That is, a document-level model is trained, the parameters of the document-level model are used to initialize parameters of the aspect-level model, and the aspect-level model is trained. In multi-task training, the document-level model, and the aspect-level model are trained simultaneously (sharing embedding and LSTM layers) with two cross-entropy objectives (one for document-level another for aspect-level). In multi-task learning, the document is represented as mean of the hidden vectors.

In combining pre-training and multi-task learning, pre-training is performed to provide parameters learned by the document-level model. In multi-task learning, the parameters learned by the document-level model are used to initialize both an aspect-level model, and a document-level model. In the combined approach, each document is represented as the last hidden vector in during the pre-training phase, but is represented as mean of hidden vectors during the multi-task learning phase.

During testing, only the aspect-level model is used to classify new data instances (e.g., data that is to be classified for sentiment at the aspect-level). It can be noted that the trained aspect-level model (the aspect-level sentiment classifier) is not able to extract aspect terms from sentences. Instead, the aspect-level model predicts (classifies) the sentiment of a given sentence with aspect terms annotated. For example, during testing, and given a sentence "food is great, service is horrible" with "food" and "service" as aspect terms, aspect-level model will predict positive and negative sentiments, respectively.

Figure 2:
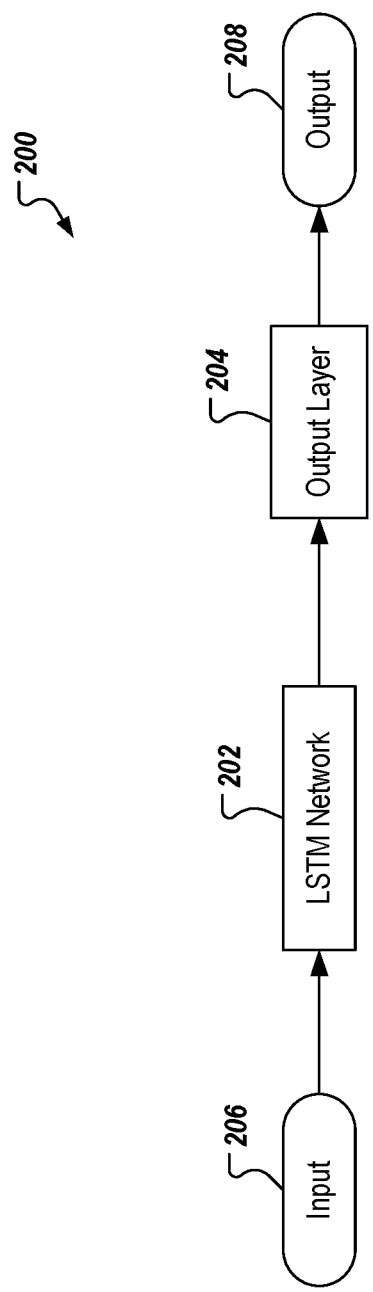
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a LSTM network 202, and an output layer 204. The LSTM network 202 processes input 206 to provide hidden vectors, as described herein. In accordance with implementations of the present disclosure, the input 206 includes document-level training data (samples) that include documents, and respective sentiment classifications. In some examples, for each document, the LSTM network 202 outputs a document representation provided as the last hidden vector in a set of hidden vectors (e.g., $[h_1, \ldots, h_n]$). In some examples, for each document, the LSTM network 202 outputs a document representation provided as a mean hidden vector over the set of hidden vectors. The output layer 204 processes the document representations to provide output 208, which includes the probability distribution p over sentiment labels on the target.

In some implementations, training is conducted based on the input 2-6 using pretraining, and/or multi-task learning. As described herein, the training objective is cross-entropy minimization as shown in equation (7), and the parameter set is $\theta_{doc} = \{E', \theta_{lstm}', W_o', b_o'\}$.

In pretraining (PRET), document-level examples are used. In some examples, the last hidden vector from the LSTM outputs is used as the document representation. The relevant parameters E, $\theta_{lstm}$, $W_o$, $b_o$ of LSTM+ATT are initialized with the pretrained weights, and training is performed on aspect-level examples to fine tune the weights, and learn $W_a$. In some examples, $W_a$ is randomly initialized.

In multi-task learning (MULT), tasks of document-level and aspect-level classification are simultaneously trained. In this setting, the embedding layer (E), and the LSTM layer ($\theta_{lstm}$) are shared by both tasks, and a document is represented as the mean vector over LSTM outputs. The other parameters are task-specific. The overall loss function is provided as:

$$L = J + \lambda U \quad (8)$$

where U is the loss function of document-level classification, and $\lambda \in (0,1)$ is a hyperparameter that controls the weight of U.

In some implementations, pretraining, and multi-task learning are combined (PRET+MULT). Here, PRET is performed on document-level examples, and the pretrained weights are used for parameter initialization for both the aspect-level model, and the document-level model during MULT, which is performed as described above.

Accordingly, and as described herein, implementations of the present disclosure provide an aspect-based sentiment classifier based on training data that includes document-level classifications. That is, the training data includes a set of documents (e.g., online reviews), and a classification associated with each document (e.g., binary classification of positive, or negative). In accordance with implementations of the present disclosure pretraining, and/or multi-task learning are used during the training phase. The trained aspect-based sentiment classifier is provided for subsequent, aspect-level sentiment classification. That is, the aspect-based sentiment classifier can process input documents (e.g., online review), identify one or more aspects, and assign respective sentiment classes (categories) to the aspects.

Experimental results show that the aspect-based sentiment classifier, trained in accordance with implementations of the present disclosure, provides improvements over traditional classifiers. For example, use of PRET in training the classifier consistently gives a 1-3% increase in accuracy over LSTM+ATT across each dataset of multiple example datasets used in the experiments. The improvements in macro-F1 scores are even more, especially in datasets where the labels are extremely unbalanced. Use of MULT in training the classifier provides similar results with respect to LSTM+ATT in some datasets, and provides improvements over LSTM+ATT in other datasets. The combination, PRET+MULT, overall yields better results than LSTM+ATT in all datasets.

It has been observed that a large percentage of the performance gain comes from PRET. To better understand the transfer effects of different layers—embedding layer (E), LSTM layer ($\theta_{lstm}$), and output layer ($W_o$, $b_o$)—ablation tests were performed on PRET with different layers transferred from the document-level model to the aspect-level model. Observations from the ablation tests are: (1) transfer is helpful in all settings (e.g., improvements over LSTM+ATT are observed even when only one layer is transferred); (2) overall, transfers of the LSTM and embedding layer are more useful than the output layer; and (3) transfer of the embedding layer is more helpful on certain datasets (e.g., datasets, in which labels are extremely unbalanced, and sentiment information is not adequately captured by the word embeddings).

To show that aspect-level classification indeed benefits from document-level knowledge, experiments were conducted to vary the percentage of document-level training examples from 0.0 to 1.0 for PRET+MULT. The improvements in accuracies with increasing number of document examples are stable across all datasets. For macro-F1 scores, the improvements on datasets have balanced labels are stable. Sharp increases in the macro-F1 scores of datasets having unbalanced labels were observed when changing the percentage from 0 to 0.4. In such cases, where labels are unbalanced) with the knowledge gained from a small number of balanced document-level examples, aspect-level predictions on neutral examples can be significantly improved.

To better understand in which conditions the implementations of the present disclosure are helpful, a subset of test examples that are correctly classified by PRET+MULT, but are misclassified by LSTM+ATT can be considered. It is seen that the benefits brought by document-level knowledge are typically shown in four ways. First of all, LSTM+ATT made obvious mistakes on some instances with common opinion words. Following are two examples where the target is enclosed in [ ] with its true sentiment indicated in the subscript:

"I was highly disappointed in the [food]$_{neg}$."

"This particular location certainly uses substandard [meats]$_{neg}$."

In the above examples, LSTM+ATT does attend to the right opinion words, but makes the wrong predictions. One possible reason is that the word embeddings without PRET do not effectively capture sentiment information, while the aspect-level training samples are not sufficient to capture sentiment information for certain words. PRET+MULT eliminates these kinds of errors. Another finding is that implementations of the present disclosure helps to better capture domain-specific opinion words due to additional knowledge from documents that are from a similar domain. For example:

"The smaller [size]$_{pos}$ was a bonus because of space restrictions."

"The [price]$_{pos}$ is 200 dollars down."

LSTM+ATT attends on smaller correctly for the first example, but makes the wrong prediction as smaller can be negative in many cases. LSTM+ATT does not capture down in the second example. Further, it was seen that LSTM+ATT made a number of errors on sentences with negation words. For example:

I have experienced no problems, [works]$_{pos}$ as anticipated.

[Service]$_{neg}$ not the friendliest to our party!

LSTMs typically only show their potential on large datasets. Without sufficient training examples, LSTM may not be able to effectively capture various sequential patterns. In accordance with implementations of the present disclosure, pretraining the network on larger document-level corpus addresses this problem.

It was also observed that PRET+MULT makes fewer errors on recognizing neutral instances. The lack of training examples makes the prediction of neutral instances very difficult for all traditional approaches including LSTM+ATT. In accordance with implementations of the present disclosure, knowledge from document-level examples with balanced labels compensates for this disadvantage.

Figure 3:
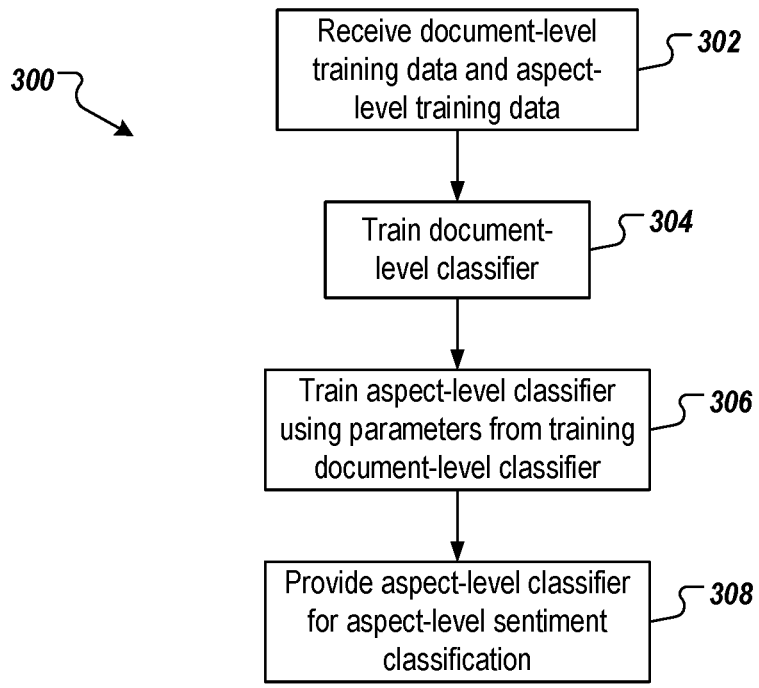
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

Document-level training data, and aspect-level training data are received (302). A document-level classifier is trained (304). For example, and as described herein, the document-level classifier is trained during a pre-training phase using the document-level data, and each document is represented as the last hidden vector returned by a LSTM network. An aspect-level classifier is trained using the parameters from the document-level classifier (306). For example, and as described herein, parameters of the aspect-level classifier are initialized using the parameters from the document-level classifier. In some examples, the aspect-level classifier is trained during a multi-task learning phase, in which the parameters learned by the document-level model are used to initialize both the aspect-level classifier, and a document-level classifier that are simultaneously trained, as described in detail herein. In the multi-task learning phase, each document is represented as the mean of hidden vectors. The aspect-level classifier is provided for aspect-level sentiment classification (308).

Figure 4:
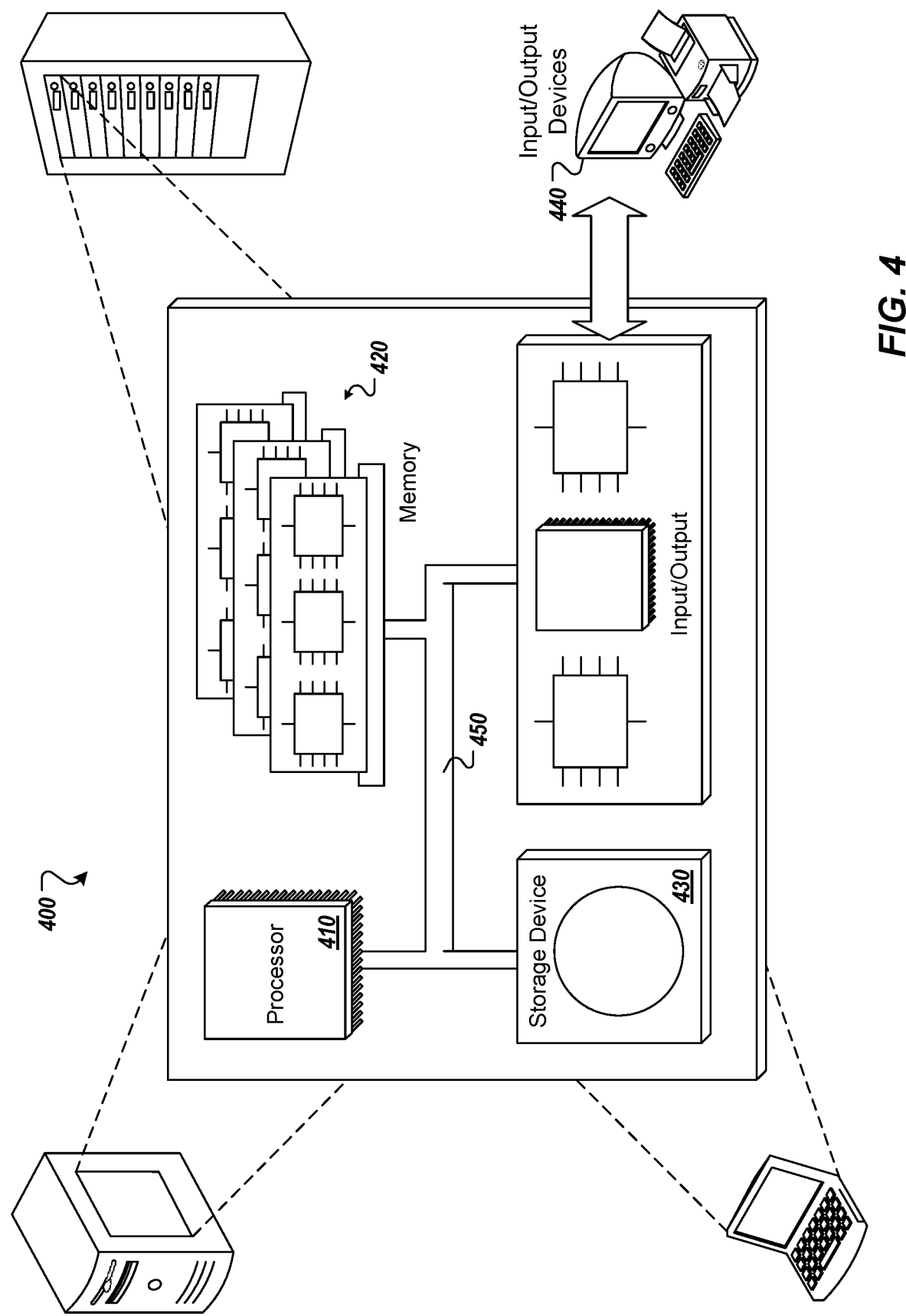
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing an aspect-level sentiment classifier, the method being executed by one or more processors and comprising:
   receiving a set of document-level training data comprising a plurality of documents, each document having a sentiment label associated therewith;
   receiving a set of aspect-level training data comprising a plurality of aspects, each aspect having a sentiment label associated therewith;
   training the aspect-level sentiment classifier comprising a long short-term memory (LSTM) network, and an output layer using one or more of pretraining, and multi-task learning based on the document-level training data and the aspect-level training data, pretraining comprising initializing parameters based on pretrained weights that are fine-tuned during training, and multi-task learning comprising simultaneous training of document-level classification and aspect-level classification; and providing the aspect-level sentiment classifier for classifying one or more aspects in one or more sentences of one or more input documents based on sentiment classes.

2. The method of claim 1, wherein training the aspect-level sentiment classifier using pretraining further comprises, for each document, using a last hidden vector provided from the LSTM network as a document representation that is processed by the output layer.

3. The method of claim 1, wherein training the aspect-level sentiment classifier using pretraining further comprises, for each document, using a mean hidden vector of a set of hidden vectors provided from the LSTM network as a document representation that is processed by the output layer.

4. The method of claim 1, wherein training the aspect-level sentiment classifier comprises using pretraining and multi-task learning in combination, where, for each document, a mean hidden vector of a set of hidden vectors provided from the LSTM network being used as a document representation that is processed by the output layer.

5. The method of claim 1, wherein a training objective for training the aspect-level sentiment classifier comprises cross-entropy minimization.

6. The method of claim 1, wherein the sentiment classes comprise positive, and negative.

7. The method of claim 1, wherein training of the aspect-level sentiment classifier comprises initializing parameters using parameters of a trained document-level classifier.

8. A non-transitory computer-readable storage medium coupled to one or more processors and having instructions stored thereon which, when executed by the one or more processors, cause the one or more processors to perform operations for providing an aspect-level sentiment classifier, the operations comprising:

receiving a set of document-level training data comprising a plurality of documents, each document having a sentiment label associated therewith;

receiving a set of aspect-level training data comprising a plurality of aspects, each aspect having a sentiment label associated therewith;

training the aspect-level sentiment classifier comprising a long short-term memory (LSTM) network, and an output layer using one or more of pretraining, and multi-task learning based on the document-level training data and the aspect-level training data, pretraining comprising initializing parameters based on pretrained weights that are fine-tuned during training, and multi-task learning comprising simultaneous training of document-level classification and aspect-level classification; and providing the aspect-level sentiment classifier for classifying one or more aspects in one or more sentences of one or more input documents based on sentiment classes.

9. The computer-readable storage medium of claim 8, wherein training the aspect-level sentiment classifier using pretraining further comprises, for each document, using a last hidden vector provided from the LSTM network as a document representation that is processed by the output layer.

10. The computer-readable storage medium of claim 8, wherein training the aspect-level sentiment classifier using pretraining further comprises, for each document, using a mean hidden vector of a set of hidden vectors provided from the LSTM network as a document representation that is processed by the output layer.

11. The computer-readable storage medium of claim 8, wherein training the aspect-level sentiment classifier comprises using pretraining and multi-task learning in combination, where, for each document, a mean hidden vector of a set of hidden vectors provided from the LSTM network being used as a document representation that is processed by the output layer.

12. The computer-readable storage medium of claim 8, wherein a training objective for training the aspect-level sentiment classifier comprises cross-entropy minimization.

13. The computer-readable storage medium of claim 8, wherein the sentiment classes comprise positive, and negative.

14. The computer-readable storage medium of claim 8, wherein training of the aspect-level sentiment classifier comprises initializing parameters using parameters of a trained document-level classifier.

15. A system, comprising:
a computing device; and
a computer-readable storage device coupled to the computing device and having instructions stored thereon which, when executed by the computing device, cause the computing device to perform operations for providing an aspect-level sentiment classifier, the operations comprising:

receiving a set of document-level training data comprising a plurality of documents, each document having a sentiment label associated therewith;

receiving a set of aspect-level training data comprising a plurality of aspects, each aspect having a sentiment label associated therewith;

training the aspect-level sentiment classifier comprising a long short-term memory (LSTM) network, and an output layer using one or more of pretraining, and multi-task learning based on the document-level training data and the aspect-level training data, pretraining comprising initializing parameters based on pretrained weights that are fine-tuned during training, and multi-task learning comprising simultaneous training of document-level classification and aspect-level classification; and providing the aspect-level sentiment classifier for classifying one or more aspects in one or more sentences of one or more input documents based on sentiment classes.

16. The system of claim 15, wherein training the aspect-level sentiment classifier using pretraining further comprises, for each document, using a last hidden vector provided from the LSTM network as a document representation that is processed by the output layer.

17. The system of claim 15, wherein training the aspect-level sentiment classifier using pretraining further comprises, for each document, using a mean hidden vector of a set of hidden vectors provided from the LSTM network as a document representation that is processed by the output layer.

18. The system of claim 15, wherein training the aspect-level sentiment classifier comprises using pretraining and multi-task learning in combination, where, for each document, a mean hidden vector of a set of hidden vectors provided from the LSTM network being used as a document representation that is processed by the output layer.

19. The system of claim 15, wherein a training objective for training the aspect-level sentiment classifier comprises cross-entropy minimization.

20. The system of claim 15, wherein the sentiment classes comprise positive, and negative.

\* \* \* \* \*